(12) United States Patent
Goudemond et al.

(10) Patent No.: US 8,105,000 B2
(45) Date of Patent: Jan. 31, 2012

(54) TOOL INSERT

(75) Inventors: Iain Patrick Goudemond, Sandton (ZA); Nedret Can, Parktown North (ZA); James Alexander Reid, Randburg (ZA); Mehmet Serdar Ozbayraktar, Roodepoort (ZA); Matthew William Cook, Ennis (IE); Stig Ake Andersin, Robertsfors (SE); Bo Christer Olofsson, Bygdea (SE); Leif Anders Sandstrom, Robertsfors (SE); Stefan Magnus Olof Persson, Umea (SE)

(73) Assignee: Element Six (Pty) Ltd., Springs (ZA)

( * ) Notice: Subject to any disclaimer, the term of this patent is extended or adjusted under 35 U.S.C. 154(b) by 360 days.

(21) Appl. No.: 11/602,576

(22) Filed: Nov. 21, 2006

(65) Prior Publication Data

US 2007/0077131 A1 Apr. 5, 2007

Related U.S. Application Data

(63) Continuation of application No. 10/504,999, filed as application No. PCT/IB03/00600 on Feb. 20, 2003, now Pat. No. 7,179,023.

(30) Foreign Application Priority Data

Feb. 21, 2002 (ZA) .................................. 2002/1473

(51) Int. Cl.
*B23D 3/00* (2006.01)
*B24D 3/06* (2006.01)
(52) U.S. Cl. ........................................ 407/119; 407/113
(58) Field of Classification Search .................. 407/119, 407/309, 295, 113–116; 76/108.1, 101.1
See application file for complete search history.

(56) References Cited

U.S. PATENT DOCUMENTS

| 2,002,229 A * | 5/1935 | Trembour et al. ............... 29/414 |
| 2,475,565 A | 7/1949 | Houchins |
| 3,369,283 A | 2/1968 | Dodsworth |

(Continued)

FOREIGN PATENT DOCUMENTS

BE 1014066 3/2003

(Continued)

OTHER PUBLICATIONS

Office Action mailed Sep. 22, 2005 for U.S. Appl. No. 10/504,998.

(Continued)

*Primary Examiner* — Will Fridie, Jr.
(74) *Attorney, Agent, or Firm* — Frommer Lawrence & Haug LLP; Ronald R. Santucci

(57) ABSTRACT

A method of producing a tool insert which comprises a central metal portion having edge regions of superabrasive material bonded thereto and presenting cutting edges or points for the tool insert is disclosed. A body (50) having major surfaces on each of opposite sides thereof, each having spaced strips (64) of superabrasive material, typically abrasive compact such as PCBN or PCD, for example, separated by a metal region or regions, such as cemented carbide, is provided. Each superabrasive strip of one major surface is arranged in register with a superabrasive strip of the opposite major surface. Alternatively, each superabrasive strip extends from one major surface to the opposite major surface. The body is severed from one major surface to the opposite major surface along at least two sets of planes intersecting at or in the respective superabrasive strips to produce the tool insert.

9 Claims, 4 Drawing Sheets

U.S. PATENT DOCUMENTS

| | | | |
|---|---|---|---|
| 3,399,442 A | | 9/1968 | Jones et al. |
| 4,215,999 A | | 8/1980 | Phaal |
| 4,448,591 A | * | 5/1984 | Ohno .............................. 51/298 |
| 4,662,896 A | * | 5/1987 | Dennis ........................... 51/293 |
| 4,866,885 A | * | 9/1989 | Dodsworth ..................... 51/293 |
| 5,232,320 A | * | 8/1993 | Tank et al. ................... 408/145 |
| 5,299,471 A | * | 4/1994 | Tank et al. ................... 76/108.1 |
| 5,318,006 A | * | 6/1994 | Walen et al. ..................... 125/36 |
| 5,503,509 A | | 4/1996 | von Haas et al. |
| 5,598,621 A | | 2/1997 | Littecke et al. |
| 5,611,251 A | | 3/1997 | Katayama |
| 5,676,496 A | | 10/1997 | Littecke et al. |
| 5,712,030 A | * | 1/1998 | Goto et al. ..................... 428/332 |
| 5,813,105 A | | 9/1998 | Littecke et al. |
| 6,090,476 A | | 7/2000 | Thysell et al. |
| 6,453,899 B1 | * | 9/2002 | Tselesin ........................... 125/15 |
| 6,464,434 B2 | | 10/2002 | Lynde |
| 6,579,045 B1 | | 6/2003 | Fries et al. |
| 6,612,207 B2 | | 9/2003 | Schiffers |
| D481,048 S | | 10/2003 | Brockett et al. |
| 6,715,967 B2 | | 4/2004 | Wiman et al. |
| 6,814,130 B2 | * | 11/2004 | Sung .............................. 164/74 |
| 7,179,022 B2 | | 2/2007 | Okamura et al. |
| 7,179,023 B2 | | 2/2007 | Goudemond et al. |
| 7,189,032 B2 | | 3/2007 | Goudemond et al. |
| 2005/0123366 A1 | * | 6/2005 | Goudemond et al. ........ 407/113 |

FOREIGN PATENT DOCUMENTS

| | | |
|---|---|---|
| EP | 0 019 461 | 11/1980 |
| EP | 0 278 703 | 8/1988 |
| EP | 0 714 719 | 6/1996 |
| FR | 1399654 | 5/1965 |
| WO | WO 02/22311 | 3/2002 |

OTHER PUBLICATIONS

Office Action mailed Apr. 22, 2008 for Application Serial No. 10/505,000.

* cited by examiner

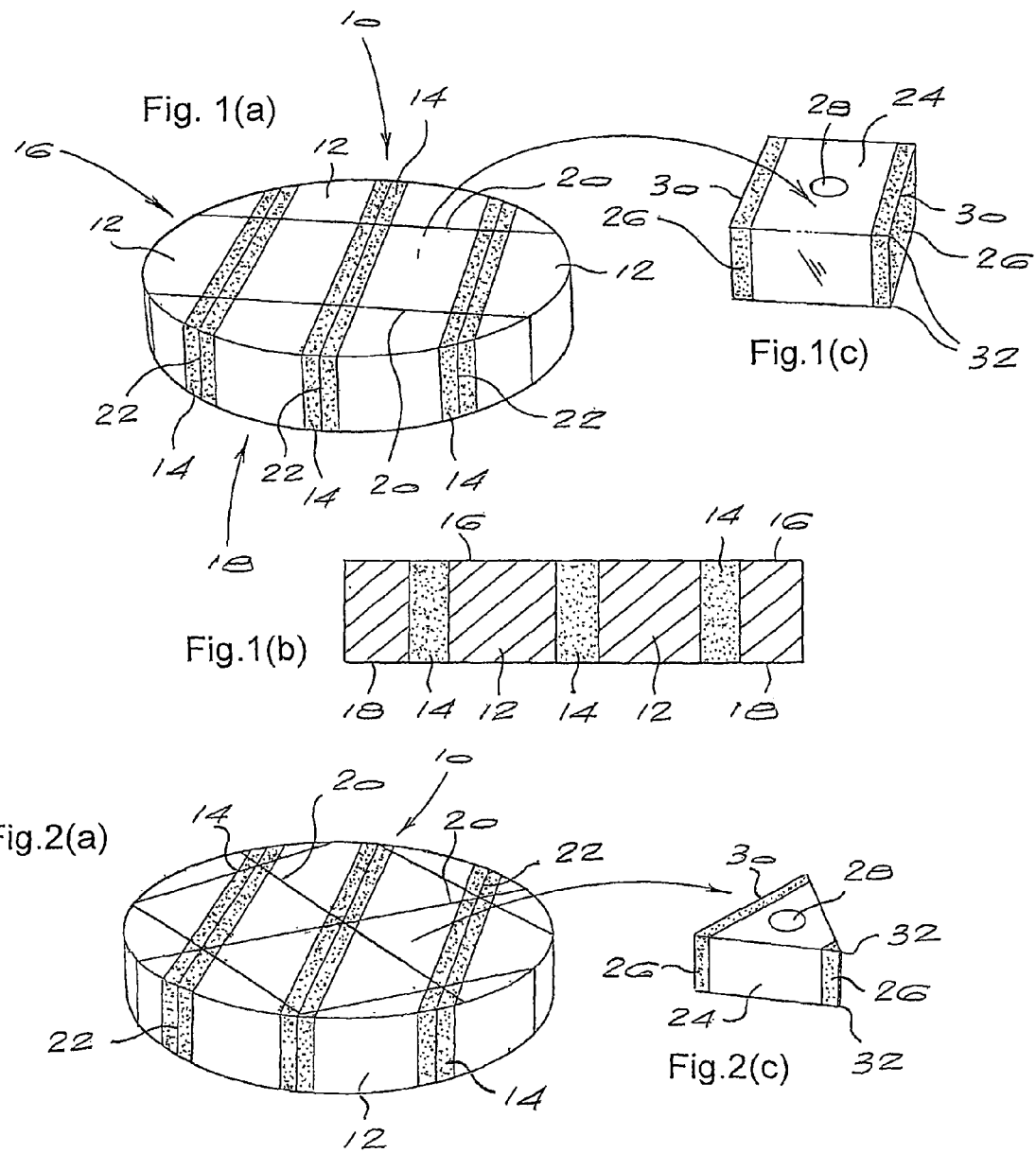

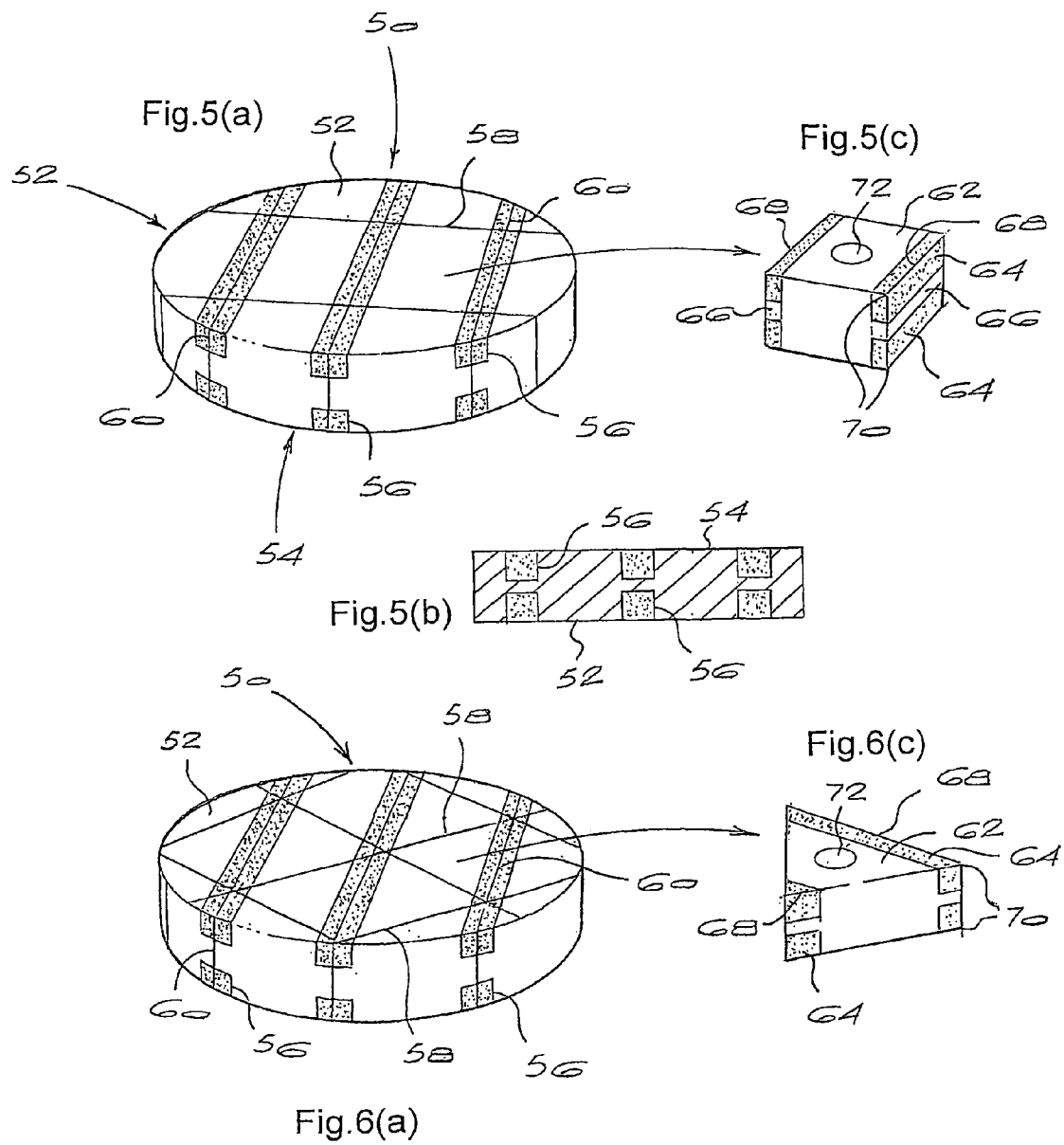

TOOL INSERT

This application is a continuation of U.S. patent application Ser. No. 10/504,999 filed Feb. 2, 2005 now U.S. Pat. No. 7,179,023 entitled "Tool Insert" which is incorporated herein by reference and which is a 371 of PCT/IB03/00600 filed on Feb. 20, 2003, published on Aug. 28, 2003 under publication number WO 03/070417 A1 and claims priority benefits of South African Patent Application No. ZA 2002/1473 filed Feb. 21, 2002.

BACKGROUND OF THE INVENTION

This invention relates to a tool insert.

Abrasive compacts are polycrystalline masses of abrasive particles, generally ultra-hard abrasive particles, bonded into a hard coherent mass. Such compacts are generally bonded to a substrate, typically a cemented carbide substrate. Diamond abrasive compacts are also known as PCD and cubic boron nitride abrasive compacts are also known as PCBN.

U.S. Pat. No. 4,807,402 describes an article comprising a support mass such as a cemented carbide mass having layers of abrasive compact bonded to each of the upper and lower surfaces thereof.

EP 0 714 719 describes a tool insert comprising first and second layers of abrasive compact bonded to a central or intermediate layer of cemented carbide, ferrous metal or high melting point metal. The tool component is such that it provides a nose and flank of abrasive compact, the nose and flank providing cutting points and edges for the tool insert. Such tool inserts may be cut, for example, by electrodischarge machining from an article described in U.S. Pat. No. 4,807,402.

U.S. Pat. No. 5,676,496 describes a metal cutting insert comprising a carbide substrate, and at least one body of superhard abrasive material, such as PCD or PCBN, bonded to an edge surface of the substrate and extending from one side surface to the other side surface of the substrate. A plurality of superhard bodies may be disposed at respective corners of the substrate. Methods of making similar inserts are disclosed in U.S. Pat. Nos. 5,598,621 and 5,813,105.

A major drawback of the methods of making directly sintered, multicornered inserts described in the prior art is one of scale, with a small number of cutting tool inserts being produced during a single high pressure, high temperature cycle.

SUMMARY OF THE INVENTION

According to the present invention, a method of producing a tool insert which comprises a central metal portion having edge regions of superabrasive material bonded thereto and presenting cutting edges or points for the tool insert, includes the steps of:

(i) providing a body having major surfaces on each of opposite sides thereof, each major surface having spaced strips of superabrasive material separated by a metal region or regions, each superabrasive strip of one major surface being in register with a superabrasive strip of the opposite major surface or each superabrasive strip extending from one major surface to the opposite major surface; and (ii) severing the body from one major surface to the opposite major surface along at least two sets of planes intersecting at or in the respective superabrasive strips to produce the tool insert.

The severing of the body is carried out in such a manner as to expose the superabrasive strips to form a cutting tip or edge in the tool insert. For example, the severing of the body may take place along at least two lines through, and transverse to, at least two of the strips and also along lines essentially longitudinally through at least two adjacent strips.

The metal region may be a hard metal such as cemented carbide, a ferrous metal or a high melting point metal. The metal region is preferably cemented carbide.

The superabrasive material is typically an abrasive compact, preferably PCD or PCBN, most preferably PCBN.

The body will preferably have a disc shape. The disc will preferably have a diameter of from about 55 mm to about 125 mm, more preferably from about 80 mm to about 100 mm, and a thickness of from about 1.6 mm to about 30 mm, more preferably from about 2 mm to about 10 mm.

Severing may take place by known methods, e.g. laser cutting or electrodischarge machining.

According to another aspect of the invention, there is provided a polyhedral tool insert comprising a central metal portion having major surfaces defined on opposite sides thereof, and at least one superabrasive strip bonded to each of the major surfaces or extending from the one major surface to the opposite major surface, each superabrasive strip providing the tool insert with a cutting tip or edge. The polyhedral tool insert is preferably star-shaped.

According to a further aspect of the invention, there is provided a tool insert comprising a central metal portion having major surfaces defined on opposite sides thereof, the central metal portion including central raised regions extending from the respective major surfaces and lowered regions located about the periphery of the raised regions, and a thin layer of superabrasive material in the form of a strip bonded to each of the major surfaces in the respective lower regions, each superabrasive strip providing the tool insert with a cutting tip or edge.

BRIEF DESCRIPTION OF THE DRAWINGS

FIG. 1a is a perspective view of an embodiment of a body for use in the method of the invention, FIG. 1b is a sectional side view of the body of FIG. 1a, FIG. 1c is a perspective view of a tool insert of FIG. 1a produced by the method of the invention, FIG. 2a is a perspective view of a second embodiment of a body for use in the method of the invention, FIG. 2c is a perspective view of a tool insert of FIG. 2a produced by the method of the invention, FIG. 5a is a perspective view of a fifth embodiment of a body for use in the method of the invention, FIG. 5b is a sectional side view of the body of FIG. 1a, FIG. 5c is a perspective view of a tool insert of FIG. 5a produced by the method of the invention, FIG. 6a is a perspective view of a sixth embodiment of a body for use in the method of the invention, FIG. 6c is a perspective view of a tool insert of FIG. 6a produced by the method of the invention.

DESCRIPTION OF EMBODIMENTS

Figures 3A, 3C:
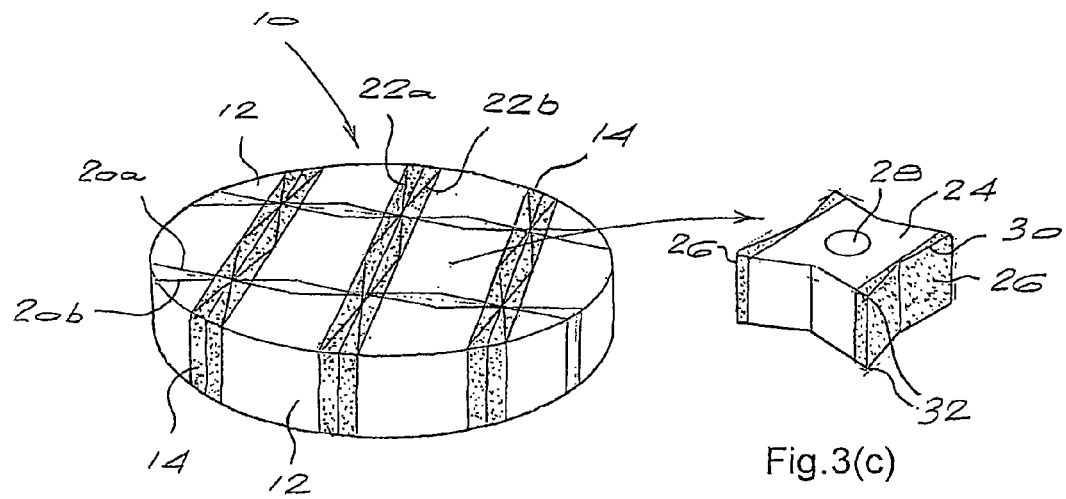
FIG. 3a is a perspective view of a third embodiment of a body for use in the method of the invention.
FIG. 3c is a perspective view of a tool insert of FIG. 3a produced by the method of the invention.

An embodiment of the invention will now be described with reference to FIG. 1 of the accompanying drawings. Referring first to FIG. 1a, a body 10 in the form of a circular disc comprises alternating regions 12 of cemented carbide and strips 14 of superabrasive material, in this case abrasive compact. The cemented carbide regions 12 and abrasive compact strips 14 are bonded to each other during a high pressure/high temperature sintering step. The body 10 has major flat surfaces 16, 18 on each of opposite sides thereof.

The body 10 is severed along spaced lines 20 transverse to the abrasive compact strips 14. The body is also severed along lines 22 longitudinally through each of the abrasive compact strips 14. Severing takes place right through the body from one major surface 16 to the other major surface 18. The product or tool insert which is produced is illustrated by FIG. 1c. This insert has a central portion 24 of cemented carbide to which are bonded longitudinal edge strips 26 of abrasive compact. The edge strips 26 extend continuously from the one major surface 16 to the other major surface 18. A hole 28 may be formed through the central portion 24 for mounting the tool insert in a tool. The edges 30 and corners 32 of the abrasive compact strips 26 provide the cutting edges or points for the tool insert.

The body 10 may be made by providing the components, in particulate form, necessary to produce the cemented carbide regions 12, for example tungsten carbide regions, and the strips 14, for example PCBN, bonded into coherent form by means of a binder such as an organic binder. The body may also be assembled using presintered strips of the hard metal. A green state body is produced by suitably locating the regions and strips in a capsule. The capsule is placed in the reaction zone of a conventional high temperature/high pressure apparatus. Subjecting the green state body to suitable elevated temperature and pressure conditions, for example, those at which the abrasive present in the strips is crystallographically stable, results in a sintered hard and bonded body as illustrated by FIGS. 1a and 1b being produced.

Figures 4A, 4C:
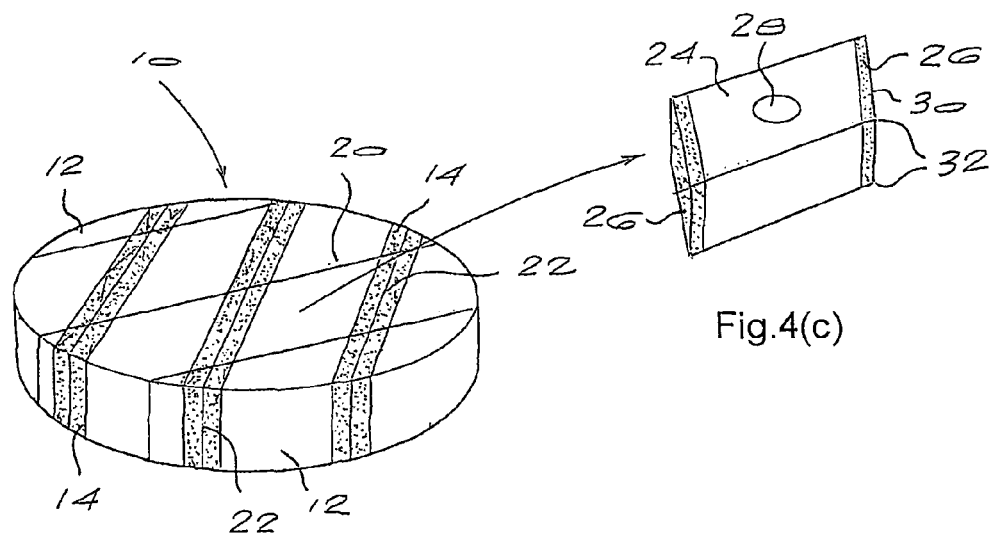
FIG. 4a is a perspective view of a fourth embodiment of a body for use in the method of the invention.
FIG. 4c is is a perspective view of a tool insert of FIG. 4a produced by the method of the invention.

The embodiments of FIGS. 2 to 4 are similar to that of FIG. 1 and like parts carry like numerals. In these embodiments, alternative sever line configurations of patterns are illustrated to produce, respectively, a triangular insert (FIG. 2c), a polyhedral tool insert having four cutting tips with included angles less than 90 degrees (FIG. 3c) and a rhombohedral insert (FIG. 4c). Once again the edge strips 26, or sections thereof, extend continuously from the one major surface 16 to the other major surface 18.

A further embodiment of the invention will now be described with reference to FIG. 5. Referring first to FIG. 5a, a cemented carbide body 50 is of disc shape having major flat surfaces 52, 54 on each of opposite sides thereof. Each major flat surface has a series of parallel spaced grooves 56 formed therein. Each groove 56 has located therein a strip of superabrasive material, in this case abrasive compact which is bonded to the cemented carbide body.

A tool insert is produced by first severing the body 50 along spaced lines 58 which are transverse to the abrasive compact filled grooves 56 from one major surface 52 to the opposite major surface 54. Thereafter, the body is severed in a transverse direction along lines 60 which pass longitudinally through each of the grooves 56. Again, severing takes place from one major surface 52 to the opposite major surface 54.

The product or tool insert which is produced is illustrated by FIG. 5c. This insert has a rectangular or square shape and a central portion 62 of cemented carbide to which are bonded strips 64 of abrasive compact. The strips 64 are provided along top and bottom edges of opposite sides of the tool insert. The strips on each side are separated by cemented carbide in the regions 66. The strips 64 each provide cutting edges 68 and cutting points 70. The central cemented carbide region 62 may have a hole 72 formed through it for mounting the tool insert in a tool.

The body 50 may be made by providing a disc shaped cemented carbide body, for example a tungsten carbide body, and cutting grooves 56 in the two major surfaces thereof. The components, in particulate form, necessary to produce the abrasive compact, for example PCBN, are placed in the grooves 56. These particles may be bonded into a coherent form by means of a binder such as an organic binder. The cemented carbide body, with the loaded grooves, is placed in the reaction zone of a conventional high temperature/high pressure apparatus. Subjecting the body to suitable elevated temperature and pressure conditions, for example, those at which the abrasive present in the strips is crystallographically stable, results in a sintered hard and bonded body as illustrated by FIGS. 5a and 5b being produced.

Figures 7A, 7C:
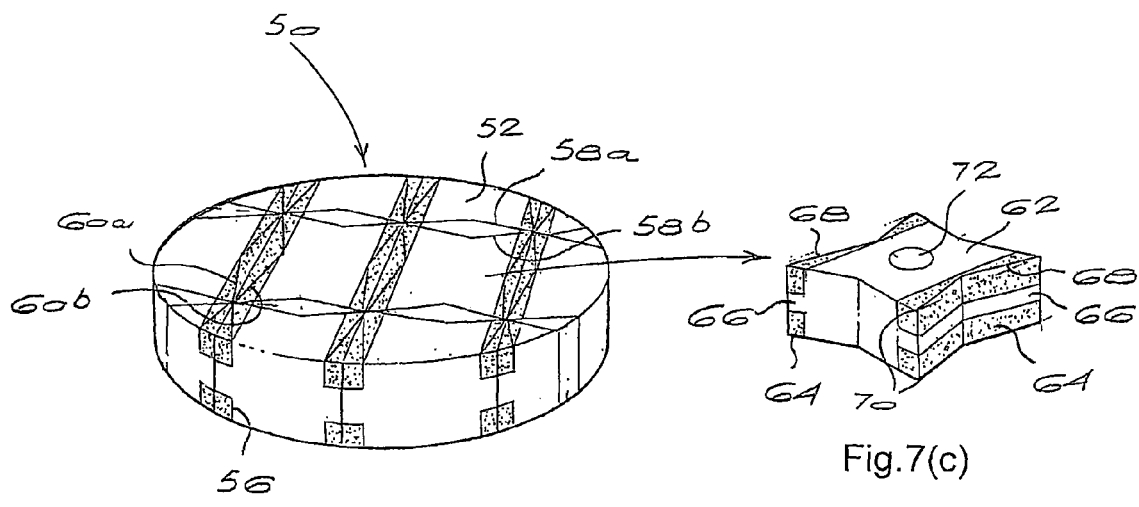
FIG. 7a is a perspective view of a seventh embodiment of a body for use in the method of the invention.
FIG. 7c is a perspective view of a tool insert of FIG. 7a produced by the method of the invention.
Figures 8A, 8C:
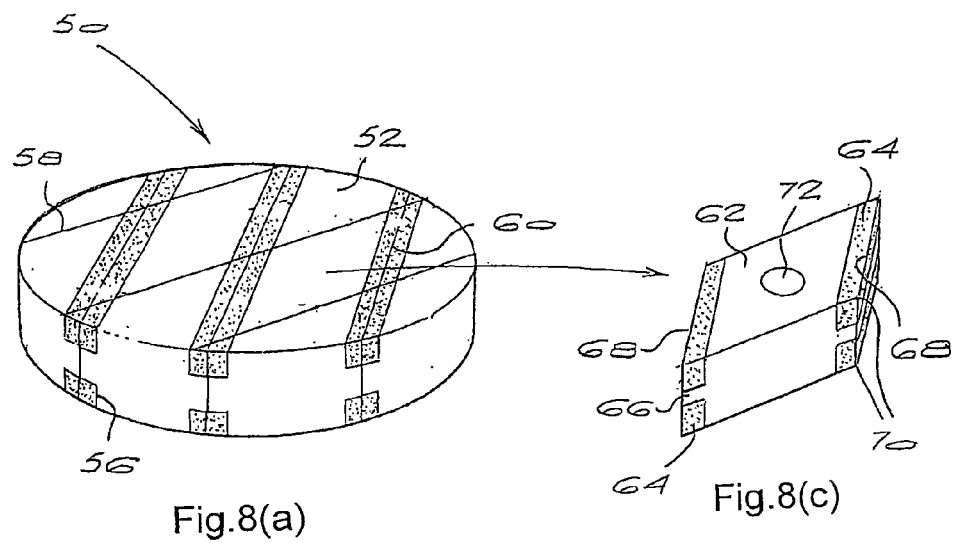
FIG. 8a is a perspective view of an eighth embodiment of a body for use in the method of the invention.
FIG. 8c is a perspective view of a tool insert of FIG. 8a produced by the method of the invention.

The embodiments of FIGS. 6 to 8 are similar to that of FIG. 5 and like parts carry like numerals. In these embodiments, alternative sever line configurations of patterns are illustrated to produce, respectively, a triangular insert (FIG. 6c), a polyhedral tool insert having low cutting tips with included angles less than 90 degrees (FIG. 7c) and a rhombohedral insert (FIG. 8c). Once again the edge strips 64, or sections thereof on each side are separated by cemented carbide in the regions 66.

A further embodiment of the invention is illustrated in FIG. 9. A disc-shaped body of cemented carbide 100 is provided. The body 100 has major surfaces 102 and 104 on each of opposite sides thereof. Each surface has scalloped strips 106 formed therein, the scalloped strips defining a cross-hatch configuration. Each scalloped strip 106 has a thin layer of superabrasive material, in this case abrasive compact bonded to it. The body 100 is severed along lines 108 and transverse thereto, lines 110. The tool insert which is produced is illustrated by FIG. 9c (perspective view) and FIG. 9d (cross-section). The tool insert comprises a body 112 of cemented carbide having scalloped edge regions 114 each of which is provided with a thin layer 116 of abrasive compact. The edges 118 and corners 120 provide cutting edges and points for the insert. A centrally located hole 122 may be provided through the cemented carbide. The geometry of the tool insert of this embodiment provides for so-called "chip-breaking" in use.

In the embodiments described above, the severing of the bodies may take place by methods known in the art, for example, laser cutting or electrodischarge machining.

The invention claimed is:

1. A polyhedral tool insert having more than six plane surfaces and comprising a central metal portion having major surfaces defined on opposite sides thereof, and a plurality of superabrasive strips bonded to each of the major surfaces or extending from the one major surface to the opposite major surface, each superabrasive strip providing the tool insert with a cutting tip or edge.

2. A polyhedral tool insert according to claim 1, which is star shaped along a plane parallel to the opposite major surfaces.

3. A polyhedral tool insert according to claim 2, wherein superabrasive strips are bonded to both major surfaces at each of the radial cutting tips of the star shaped tool insert.

4. A tool insert comprising a central metal portion having major surfaces defined on opposite sides thereof, the central metal portion including central raised regions extending from the respective major surfaces and scalloped edge regions located about the periphery of the raised regions, and a thin layer of superabrasive material in the form of a strip bonded to each of the major surfaces in the respective scalloped edge regions, each superabrasive strip providing the tool insert with a cutting tip or edge.

5. A tool insert according to claim 4, wherein the thin layer of superabrasive material is bonded to the entire peripheral scalloped edge region on each of the opposite major surfaces.

6. The polyhedral tool insert according to claim 1, wherein the superabrasive strips are polycrystalline diamond.

7. The polyhedral tool insert according to claim 1, wherein the superabrasive strips are polycrystalline cubic boron nitride.

8. The polyhedral tool insert according to claim 4, wherein the superabrasive material is polycrystalline diamond.

9. The polyhedral tool insert according to claim 4, wherein the superabrasive material is polycrystalline cubic boron nitride.

* * * * *